(12) United States Patent
Kaibel et al.

(10) Patent No.: US 7,297,249 B2
(45) Date of Patent: Nov. 20, 2007

(54) HETEROGENEOUSLY CATALYZED REACTIONS AND APPARATUS THEREFOR

(75) Inventors: Gerd Kaibel, Lampertheim (DE); Christian Miller, Ruppertsberg (DE); Helmut Jansen, Dormagen (DE); Björn Kaibel, Hilden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 714 days.

(21) Appl. No.: 10/309,260

(22) Filed: Dec. 4, 2002

(65) Prior Publication Data

US 2003/0106837 A1 Jun. 12, 2003

(30) Foreign Application Priority Data

Dec. 6, 2001 (DE) ............................... 101 59 816

(51) Int. Cl.
*C07C 5/02* (2006.01)
*B01J 8/02* (2006.01)

(52) U.S. Cl. .................. 208/46; 208/120; 208/213; 585/250; 422/177; 422/179; 422/190; 422/211; 422/222; 261/94; 261/97; 261/112.2; 261/113

(58) Field of Classification Search ............... 208/120, 208/213; 261/94, 97, 112.2, 113; 422/177, 422/179, 190, 211, 222; 568/568; 585/250
See application file for complete search history.

(56) References Cited

U.S. PATENT DOCUMENTS 4,950,430 A * 8/1990 Chen et al. ............... 261/112.2
5,939,589 A * 8/1999 Kaibel et al. ............... 568/568
6,425,574 B1 * 7/2002 Sunder .......................... 261/94
6,511,053 B2 * 1/2003 Kaibel et al. ............ 261/112.2
6,672,572 B2 * 1/2004 Werlen .......................... 261/94
6,783,119 B2 * 8/2004 Zich et al. ............... 261/112.2
2002/0003313 A1 1/2002 Kaibel et al. ................ 261/94

FOREIGN PATENT DOCUMENTS

DE 196 01 558 7/1997
DE 100 31 119 1/2002

OTHER PUBLICATIONS

VDI Wärmeatlas [VDI Thermal Handbook], 5th Edition, 1998.

* cited by examiner

*Primary Examiner*—Glenn Caldarola
*Assistant Examiner*—Prem C. Singh
(74) *Attorney, Agent, or Firm*—Novak Druce & Quigg, LLP

(57) ABSTRACT

A fixed-bed reactor is described for carrying out reactions of fluid reaction mixtures in the presence of a particulate heterogeneous catalyst having a structured packing which forms interstices in the reactor interior, in which the quotient of the hydraulic diameter for the fluid flow through the structured packing and the equivalent diameter of the catalyst particles is in the range from 2 to 20, preferably in the range from 5 to 10, to such an extent that the catalyst particles are introduced into the interstices, loosely distributed and discharged under the action of gravity.

12 Claims, 3 Drawing Sheets

HETEROGENEOUSLY CATALYZED REACTIONS AND APPARATUS THEREFOR

Figure 1:
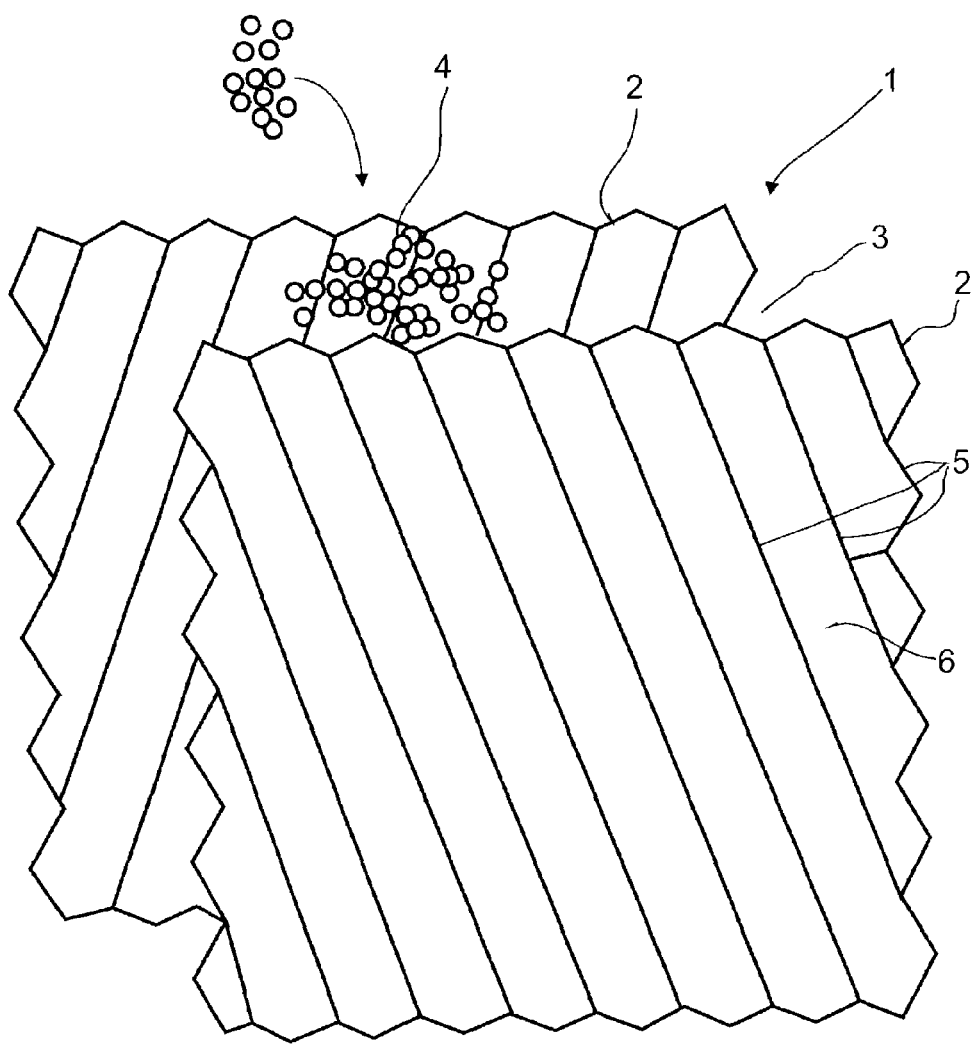

The invention relates to a fixed-bed reactor for carrying out reactions of fluid reaction mixtures in the presence of a particulate heterogeneous catalyst, a process and a use.

Although fixed-bed reactors are widely used in the chemical industry, their ability to be used in the technical application frequently meets system-specific limits. An interfering factor is, for example, that with high catalyst beds the lowest regions of the bed are highly mechanically loaded, since they must bear the sometimes considerable overall weight of the catalyst bed. In the catalyst development, this frequently forces compromised solutions, in that a catalyst which has been optimized with respect to its chemical performance must be modified at the cost of its space-time yield and selectivity in such a manner that it can bear the unavoidable mechanical loads. A further compromised solution which is also practiced is that shorter periods for catalyst exchange combined with a decrease in capacity of the plant and additional costs must be accepted.

Fixed-bed reactors have the characteristic that cross exchange of the flowing media occurs only to a slight extent. In the case of highly exothermic reactions, this increases the hazard of zones having excess reaction temperature, called hot spots. This characteristic forces precautionary measures to be taken with respect to the maximum permissible reaction temperature, to prevent reliably locally initiated runaway reactions, for example methanizations, in the case of hydrogenations. Selection of the most economical operating point is restricted.

A further disadvantageous characteristic of fixed-bed reactors is that in the case of fine catalysts, which are most frequently chosen with respect to catalyst activity, high pressure drops occur. In particular in the case of reactions involving gaseous media, this can greatly impair the economic efficiency.

It is an object of the present invention, therefore, to provide a fixed-bed reactor which does not have said disadvantages.

We have found that this object is achieved by a fixed-bed reactor for carrying out reactions of fluid reaction mixtures in the presence of a particulate heterogeneous catalyst having a structured packing which forms interstices in the reactor interior.

In the invention, the quotient of the hydraulic diameter for the fluid flow through the structured packing and the equivalent diameter of the catalyst particles is in the range from 2 to 20, preferably in the range from 5 to 10, to such an extent that the catalyst particles are introduced into the interstices, loosely distributed and discharged under the action of gravity, and the structured packing has horizontal surface portions.

It has thus been found that it is possible to equip a fixed-bed reactor with a structured packing and to introduce, into the interstices of the same, a particulate heterogeneous catalyst.

The hydraulic diameter is defined as is known as the ratio between four times the area through which flow passes and the circumference thereof. Actual calculation of the same for a structured packing having linear corrugations is described in the description of the figures, in connection with FIG. 2.

The equivalent diameter of particles, in the present case catalyst particles, is defined by the ratio between six times the volume and the surface area of the particle (see in this context VDI Wärmeatlas [VDI Thermal Handbook], $5_{th}$ Edition, 1998, Lk1).

Maintaining a quotient of the hydraulic diameter for the gas flow through the structured packing and the equivalent diameter of the catalyst particles within the abovedefined range ensures according to the invention that the catalyst particles are introduced into the interstices of the structured packing, distributed and discharged loose under the action of gravity.

With respect to the structured packings which can be used, there are in principle no restrictions: the internals which arc regularly used in distillation technology can be used. The structured packings form interstices in the reactor interior which must in principle be connected to one another to ensure through-flow of the reaction mixture.

The invention is not restricted with respect to the shape and size of the catalyst particles which can be used; however, to improve the space-time yield of heterogeneously catalyzed reactions, high specific surface areas and thus small catalyst particles are preferred. In beds of catalyst particles, as is known, the pressure drop increases with decreasing size of catalyst particles and limits the liquid and vapor throughputs to uneconomically small values. In contrast, according to the invention, it is precisely small catalyst particles, which are also preferred with respect to catalytic activity, which are particularly suitable for the combined use with a structured packing, since they are simpler to introduce the smaller are their dimensions compared with the dimensions of the interstices of the structured packing or random packings.

The catalyst particles are preferably unsupported catalysts, but it is also possible to use supported catalysts. With respect to the shape of the catalyst particles, there are in principle no limitations; frequently solid or hollow cylinders, spheres, saddles or honeycomb or star-shaped rods are used. Suitable dimensions of the catalyst particles are, for example, for solid cylindrical catalyst particles from about 1.5×4 to about 4×8 mm.

In the reactor interior, structured packings are used, that is to say packings made up systematically in a regular geometry and having defined package regions for the counterflow phases. In the present invention, in principle, structured packings as developed for distillation technology are used. Structured packings are generally made up of corrugated metal sheets, expanded metal layers or mesh layers essentially arranged in parallel to one another and having usually linear corrugations which subdivide the structured metal packing sheet, the expanded metal layer or mesh layer into corrugated surfaces, and in which case the angle of inclination of the corrugated surface to the horizontal is usually from 60 to 45°. For the present invention, structured packings are preferred which are formed from structured metal packing sheets for installation in the direction of the longitudinal axis of the fixed-bed reactor and have linear corrugations which subdivide the structured metal packing sheet into corrugated surfaces, the angle of inclination of the corrugated surfaces to the horizontal being in the range from 90 to 45°, preferably 60°. By arranging successive structured metal packing sheets at the same angle of inclination to the vertical, but with reversed sign, the known cross-channel structures are produced, as are exhibited, for example, by structured packings of the types Mellapak, CY or BX from Sulzer AG, CH-8404 Winterthur, or the types A3, BSH, B1 or M from Montz GmbH, D-40723 Hilden.

It is possible to combine the structured packings to give individual layers of from about 0.15 to 0.25 m in height.

For use in the fixed-bed reactor, preferably special embodiments of structured packings are used which permit an increased gas flow.

In a particularly preferred embodiment, one or more structured metal packing sheets of high specific surface area are arranged in alternation with one or more structured metal packing sheets of low specific surface area. This forms interstices each having a different hydraulic diameter. Particularly preferably, the specific surface areas of the structured metal packing sheets are chosen in such a manner that, firstly, interstices are formed for which the quotient of the hydraulic diameter and the equivalent diameter of the catalyst particles is <1 and, secondly, interstices for which the quotient of the hydraulic diameter and the equivalent diameter of the catalyst particles is >2, in particular in the above-defined range from 2 to 20, in particular from 5 to 10. No catalyst particles are charged into the first-mentioned interstices having a ratio of hydraulic diameter and equivalent diameter of the catalyst particles <1, the same are, according to the invention, only charged into the interstices where said quotient is >2. This particular embodiment ensures an increased gas flow with low pressure drops.

Preferably, the starting material for the inventive structured packings is usually additionally supplied with openings, for example with circular holes of diameter from about 4 to 6 mm, in order to increase the flooding point of the structured packing and to enable higher reactor load. Flooding point of a structured packing is the volume of gas or liquid per unit time and cross sectional area at which the trickle-flow liquid is backed up or entrained by the gas stream in and above the structured packing up to the point of complete flooding. Exceeding this load causes a sharp increase in pressure drop.

Advantageous structured packings are those which have surface portions which are inclined at an angle to the vertical. The horizontal surface portions receive some of the weight of the catalyst particles and direct it toward the reactor wall. This reduces the mechanical load of the catalyst.

The specific surface area of structured packings for distillation is from about 250 to 750 $m^2/m^3$. For inventive fixed-bed reactors, depending on the trickling behavior of the catalyst particles, their shape and dimensions, structured packings are preferably used having specific surface areas in the range from about 50 to 400 $m^2/m^3$.

In the case of structured packings for distillation, wall thicknesses of the metal sheets of typically from 0.07 to 0.1 mm suffice. In contrast, in the case of heterogeneously catalyzed reactions, depending on catalyst weight and mechanical stability of the catalyst grains, wall thicknesses of the metal sheets in the range from 0.1 to 5 mm, preferably from 0.15 to 1.0 mm are used.

Preferably, structured packings are used which have a decreased flow resistance at their surface, this decreased flow resistance being achieved in particular by perforations and/or roughness of the material of the structured packing or by constructing the structured packing as expanded metal. The perforations here are preferably dimensioned with respect to their number and dimensions in such a manner that at least a proportion of 20%, preferably a proportion of from 40 to 80%, of the liquid passes through these perforations and flows onto the catalyst particles lying beneath them.

In a preferred embodiment, the structured packing material consists of expanded metal, the structured packing material being constructed in such a manner that the liquid flowing off as film on the structured packing material can flow off downward as completely as possible through the structured packing material, dripping being reinforced by outlet edges.

Preferably, the perforations are provided in the vicinity of the lower corrugated edges of the structured metal packing sheets, as described in DE-A 100 31 119. As a result, the fluid is preferably passed onto the upper side of the inclined corrugated surfaces and the liquid load on the critical lower side is decreased. For this purpose structured packings made of structured metal packing sheets are used having linear corrugations which subdivide the structured metal packing sheets into corrugated surfaces and which have a width a, measured from corrugated edge to corrugated edge, and perforations, and where a proportion X of at least 60% of the perforations has a distance b of at most 0.4 a to the lower corrugated edge of each corrugated surface. Preferably, the proportion of the area taken up by the perforations of a corrugated surface is from 5 to 40%, in particular from 10 to 20%, of this corrugated surface.

In a further preferred embodiment, the structured packing is formed from rippled or corrugated layers and flat layers arranged alternately, the flat layers not extending to the edge of the structured packings, or having an increased gas permeability, in particular holes, in the edge zone of the structured packing, in accordance with DE-A 196 01 558.

It is also possible to provide, instead of flat intermediate layers, layers which are less intensively rippled or corrugated.

The term edge zone of the structured packing is applied to a concentric volume element which extends from an outer cylinder surface to an inner cylinder surface (the structured packings typically have a cylindrical shape), with the outer cylinder surface being defined by the outer ends of the rippled or corrugated layers and the inner cylinder surface being defined by the outer ends of the flat layers. The horizontal line connecting the inner cylinder surface to the outer cylinder surface and which is oriented in parallel to the structured packing layers and passes through the reactor axis intersects from one to twenty, preferably from three to ten, channels which are formed by layers in each case disposed next to one another. In the case of flat layers which do not extend into the edge zone, up to twenty channels are thus cleared next to one another in the edge zone. Second layers extending into the edge zone are preferably gas permeable on from 20 to 90%, particularly preferably on from 40 to 60%, of their area, that is to say, for example, are provided with holes.

The invention also relates to a process for carrying out heterogeneously catalyzed reactions of a fluid reaction mixture in a fixed-bed reactor which is equipped as described above with a structured packing in combination with a bed of catalyst particles. Preferably, the fixed-bed reactor is operated with respect to gas and liquid loads in such a manner that the load per unit cross-sectional area is from 30 to 300 $m^3/m^2 \cdot h$, preferably from 80 to 120 $m^3/m^2 \cdot h$.

In the inventive process, the fluid reaction mixture is preferably a gas mixture.

In a further preferred process, the fluid reaction mixture is a gas/liquid mixture and the gas and the liquid are passed cocurrently through the fixed-bed reactor.

The invention also relates to the use of the above-described fixed-bed reactor and the process for carrying out heterogeneously catalyzed reactions, in particular for carrying out highly exothermic or highly endothermic reactions, preferably for carrying out hydrogenations or oxidations.

The inventive fixed-bed reactor having a combination of a catalyst bed and a structured packing is thus advantageous with respect to the possible throughput, since the catalyst bed has a higher porosity on the surfaces of the structured packing than in the interior of the catalyst bed.

The improved transverse mixing of the gas and liquid streams over the reactor cross section is also advantageous, as is limiting maldistribution, preventing hot spots. The cross-channel structure preferably enables a particularly advantageous cross exchange of gas and liquid streams in the catalyst layer and thus makes the temperature profile uniform. This cross exchange can be improved still further if flat structured packing layers which must not extend to the edge of the structured packing are placed between the corrugated structured packing layers.

The risk of forming unwanted hot spots is additionally decreased by the improved heat conductivity of the structured packing material, since the heat conductivity is significantly greater in metals than in the porous catalyst bed.

These internals act particularly advantageously with respect to the mechanical load of the catalysts. It is known that in many applications of fixed-bed reactors, the mechanical strength of the catalyst particles is limited both with respect to the reactor design and also the achievable running time. By introducing structured packings, the catalyst particles can be greatly relieved mechanically, in that the structured packings predominantly take up the weight of the catalyst bed and divert it to the reactor wall via support grids. Furthermore, the catalyst is embedded in the structured packing channels and is thus mechanically relieved in the event of a pressure pulse.

The invention will be described in more detail below with reference to a drawing and examples.

Figure 2:
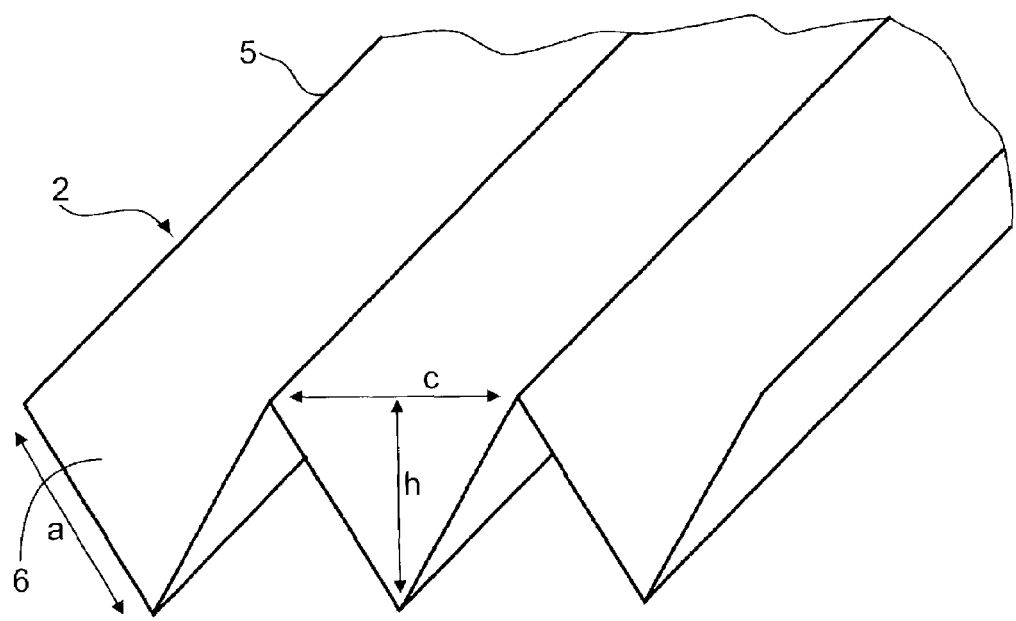
Figure 3:
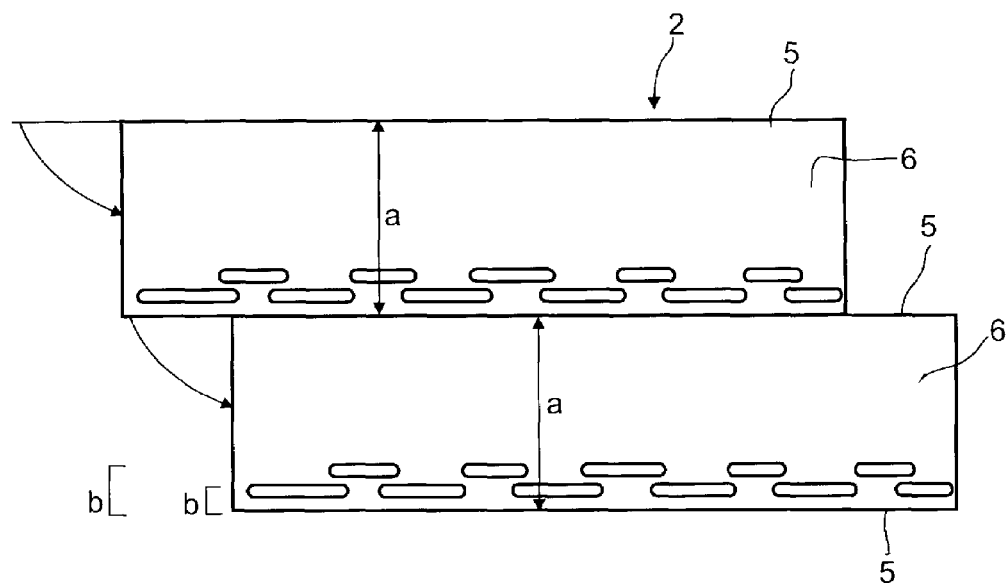

In the drawing, in detail,

FIG. 1 shows a diagrammatic representation of an embodiment of an inventive structured packing, FIG. 2 shows the diagrammatic representation of a structured metal packing sheet having linear corrugations and FIG. 3 shows the diagrammatic representation of a structured metal packing sheet having perforations.

The diagrammatic representation in FIG. 1 shows a structured packing 1 having structured metal packing sheets 2 which have linear corrugations 5 with formation of corrugated surfaces 6, with in each case one interstice 3 being formed between two sequential structured metal packing sheets 2. According to the invention catalyst particles 4 are charged into the same interstice.

FIG. 2 shows diagrammatically a structured metal packing sheet 2 having linear corrugations 5 and corrugated surfaces 6. a is the width of a corrugated surface 6 measured from corrugated edge 5 to corrugated edge 5, c represents the distance between two adjacent corrugated edges 5 and h is the height of a corrugation.

FIG. 3 shows diagrammatically a particular embodiment of a structured metal packing sheet 2 having corrugated edges 5, corrugated surfaces 6 and a width a of the corrugated surfaces 6 having perforations which have a distance b from the lower corrugated edge 5 of each corrugated surface 6.

Hereinafter, with reference to FIG. 2, calculation of the hydraulic diameter is explained for a structured packing having linear corrugations:

The structured metal packing sheet 2 shown by way of example in FIG. 2 has linear corrugations 5 disposed in parallel to one another which subdivide the structured metal packing sheet into corrugated surfaces 6. The width of a corrugated surface 6, measured from corrugated edge 5 to corrugated edge 5 is designated a, the distance between two sequential corrugated edges 5 is designated c and the height of the corrugation is designated h. The hydraulic diameter of the gas flow for a structured packing made up of such structured metal packing sheets is then calculated from the formula $$d_{hydraulic,gas} = \frac{2c \cdot h}{c + 2a}$$

EXAMPLES

Example 1

Loose Packing Experiments

A reactor having a diameter of 0.3 m was equipped with two structured distillation packings arranged offset by 90° of type B1 from Montz, the height of each structured packing being 23 cm. Catalyst particles were introduced by loose packing into the structured distillation packings. The volume charged and the ease of handling during introduction and removal of the catalyst particles were determined. The catalyst particles used were solid cylinders of $\gamma$-$Al_2O_3$ and $TiO_2$. The solid $\gamma$-$Al_2O_3$ cylinders of a diameter of 1.5 mm and a height of from 1 to 4 mm have an equivalent particle diameter of 2 mm. The solid $TiO_2$ cylinder of a diameter of 4 mm and a height of from 2 to 10 mm have an equivalent particle diameter of 5 mm.

1A) Loose packing experiments using solid $\gamma$-$Al_2O_3$ cylinders, diameter 1.5 mm. Structured packings of type B1 from Montz each having different specific surface areas and different angles of inclination of the corrugated surfaces to the horizontal were used.

$1A_1$) A structured sheet metal packing of type B1-125.80 having a specific surface area of 125 $m^2/m^3$ and an angle of 80° to the horizontal was used. 90% of the superficial volume was charged with the abovementioned catalyst particles. The structured packing had a hydraulic diameter of 19 mm. The catalyst was able to be introduced very readily and, in the dry state, also trickled out again completely. The ratio of the equivalent diameter of catalyst particles to the hydraulic diameter of the structured packing was 9.

$1A_2$) A structured packing of type B1-250.80 having a specific surface area of 250 $m^2/m^3$ and an angle of 80° to the horizontal was charged with the abovementioned catalyst particles. In this case 80% of the superficial volume was able to be charged with catalyst particles. The structured packing had a hydraulic diameter of 9.4 mm. The catalyst was able to be introduced very readily and, in the dry state, also trickled out again completely. The ratio of equivalent diameter of the catalyst particles to the hydraulic diameter of the structured packing was 4.7.

$1A_3$) A packing of type B1-250.60 was used, that is to say having a specific surface area of 250 $m^2/m^3$ and an angle of 60° to the horizontal. 80% of the superficial volume of the same was able to be charged with the abovementioned catalyst particles. The structured packing had a hydraulic diameter of 9.4 mm. The catalyst was able to be introduced very readily and, in the dry state, also trickled out again completely. The ratio of the equivalent diameter of the catalyst particles to the hydraulic diameter of the structured packing was 4.7.

1B) Solid $TiO_2$ cylinders, diameter 4 mm The above-described structured sheet metal packings of type B1-125.80 and B1-250.60 were used.

$1B_1$) A structured sheet metal packing of type B1-125.80, that is to say having a specific surface area of 125 $m^2/m^3$ and an angle of 80° to the horizontal was charged with the abovementioned catalyst particles to fill 80% of the superficial volume. The structured packing had a hydraulic diameter of 19 mm. The catalyst was able to be introduced very readily and, in the dry state, also trickled out again completely. The ratio of the equivalent particle diameter of the catalyst particles to the hydraulic diameter of the structured packing was 4.5.

1B$_2$) A structured packing of type B1-250.60, that is to say having a specific surface area of 250 m$^2$/m$^3$ and an angle of 60° to the horizontal was charged with the abovementioned catalyst particles to fill 50% of its superficial volume. The structured packing had a hydraulic diameter of 9.4 mm. The catalyst was able to be introduced very readily and, in the dry state, also trickled out again completely. The ratio of the equivalent diameter of the catalyst particles to the hydraulic diameter of the structured packing was 2.4.

In contrast, in the case of commercially conventional structured catalyst packings in which the catalyst is introduced in pockets, for example of the type Katapak from Sulzer or Multipack from Montz, only from 20 to 30% of the superficial volume, in exceptional cases a maximum of 50% of the superficial volume, could be charged with catalyst.

Example 2

Pressure Drop Measurements

In a column section of diameter 0.1 m, pressure drop measurements were made using the test mixture nitrogen/isopropanol. For this, the catalyst bed was introduced into the column section and irrigated (one drip position) with a defined amount of isopropanol. A defined amount of nitrogen was passed in countercurrent to this from bottom to top through the structured packing/bed. In the experiments the specific pressure drop per unit height of structured packing or bed was measured and the flooding point was determined. The catalyst particles used were solid γ-Al$_2$O$_3$ cylinders. The solid cylinders (d=1.5 mm, h=1-4 mm) had an equivalent particle diameter of 2 mm. The specific pressure drop and the flooding point of a bed introduced into a structured packing were then determined.

Example 2

Comparative Example

At a bed height of 45 cm, at an F factor of 0.038 Pa$^{0.5}$ (corresponding to a gas flow rate of 1000 l/h) and a trickle rate of 0.178 m$^3$/m$^2$h (corresponding to a liquid flow rate of 1.4 l/h), a specific pressure drop of 3.33 mbar/m was measured. The structured packing, at a constant liquid load of 0.178 m$^3$/m$^2$h, began to flood from an F factor of 0.0575 Pa$^{0.5}$ (corresponding to a gas flow rate of 1500 l/h).

Example 2

According to the Invention:

Bed introduced into two layers, offset by 90°, of a structured packing type BS-250.60 from Montz.

At a bed height of 46 cm, at an F factor of 0.038 Pa$^{0.5}$ (corresponding to a gas flow rate of 1000 l/h) and at an irrigation rate of 0.178 m$^3$/m$^2$h (corresponding to a liquid flow rate of 1.4 l/h), a specific pressure drop of 1.09 mbar/m was measured. The structured packing, at a constant liquid load of 0.178 m$^3$/m$^2$h, began to flood from an F factor of 0.114 Pa$^{0.5}$ (corresponding to a gas flow rate of 3000 l/h). The maximum gas load could thus be increased by a factor of 2, compared with the bed which was not introduced into a structured packing.

We claim:

1. A fixed-bed reactor for carrying out reactions of fluid reaction mixtures in the presence of a heterogeneous particulate catalyst having a structured packing which forms interstices in the reactor interior, in which the reactor has first and second part regions which are arranged in alternation and which differ by the specific surface area of the structured packing in such a manner that in the first part regions the quotient of the hydraulic diameter for the gas stream through the structured packing and the equivalent diameter of the catalyst particles is in the range from 2 to 20, the catalyst particles being introduced into the interstices, distributed and discharged loose under the action of gravity and in the second part regions the quotient of the hydraulic diameter for the gas stream through the structured packing and the equivalent diameter of the catalyst particles is less than 1 and no catalyst particles are introduced into the second part regions.

2. A fixed-bed reactor as claimed in claim 1, wherein in the first part regions the quotient of the hydraulic diameter for the gas stream through the structured packing and the equivalent diameter of the catalyst particles is in the range from 5 to 10.

3. A process for carrying out heterogeneously catalyzed reactions of a fluid reaction mixture in a fixed-bed reactor as claimed in claim 1, which comprises operating the fixed-bed reactor with respect to gas and liquid loads in such a manner that the load per unit cross-sectional area is from 30 to 300 m$^3$/m$^2$·h.

4. The process as claimed in claim 3, wherein the fluid reaction mixture is a gas/liquid mixture and wherein the gas and the liquid are passed cocurrently through the fixed-bed reactor.

5. The fixed-bed reactor as claimed in claim 1, wherein the quotient of the hydraulic diameter for the fluid flow through the structured packing and the equivalent diameter of the catalyst particles is in the range from 5 to the 10.

6. The fixed-bed reactor as claimed in claim 1, wherein the structured packing has a cross-channel structure.

7. The fixed-bed reactor as claimed in claim 1, wherein the structured packing comprises structured metal packing sheets installed in the direction of the longitudinal axis of the fixed-bed reactor, said sheets structure metal packing sheets comprising linear corrugations which subdivide the structured metal packing sheets into corrugated surfaces, wherein the angle of inclination of the corrugated surface relative to a horizontal is in the range from 80 to 45°.

8. The fixed-bed reactor as claimed in claim 1, wherein the structured packing comprises structured metal packing sheets installed in the direction of the longitudinal axis of the fixed-bed reactor, said structured metal packing sheets having linear corrugations which subdivide the structured metal packing sheets into corrugated surfaces, wherein the angle of inclination of the corrugated surfaces relative to a horizontal is between 65° to 55°.

9. The fixed-bed reactor as claimed in claim 1, wherein the structured packing comprises structured metal packing sheets installed in the direction of the longitudinal axis of the fixed-bed reactor, said structured metal packing sheets having linear corrugations which subdivide the structured metal packing sheets into corrugated surfaces, wherein the angle of inclination of the corrugated surfaces relative to a horizontal is about 60°.

10. The fixed-bed reactor as claimed in claim 1, wherein the structured packing comprises a surface that has a reduced resistance to flow, said reduced resistance flow provided by at least one of surface perforations, roughness of the structured packing material, and constructing the structured packing as expanded metal.

11. The fixed-bed reactor as claimed in claim 1, wherein the structured packing is formed from rippled or corrugated layers and flat layers arranged alternately, the flat layers not extending to the edge of the structured packing.

12. A fixed-bed reactor as claimed in claim 1, wherein the structured packing comprises structured metal packing sheets having linear corrugations which subdivide the structured metal packing sheets into corrugated surfaces and which have a width a, measured from corrugated edge to corrugated edge, and perforations, wherein a proportion X of at least 60% of the perforations has a distance b of at most 0.4a to the lower corrugated edge of each corrugated surface.

* * * * *

UNITED STATES PATENT AND TRADEMARK OFFICE
CERTIFICATE OF CORRECTION

PATENT NO. : 7,297,249 B2 Page 1 of 1
APPLICATION NO. : 10/309260
DATED : November 20, 2007
INVENTOR(S) : Kaibel et al.

It is certified that error appears in the above-identified patent and that said Letters Patent is hereby corrected as shown below:

- Claim 7, col. 8, line 46: "surface" should read --surfaces--
- Claim 8, col. 8, line 55: "65°to 55°" should read --65° to 55°--
- Claim 10, col. 8, line 66: "resistance flow" should read --resistance to flow--
- Claim 12, col. 10, line 2: "a width a" should read --a width $a$--
- Claim 12, col. 10, line 3: "a proportion X" should read --a proportion $X$--
- Claim 12, col. 10, line 4: "a distance b" should read --a distance $b$--
- Claim 12, col. 10, line 6: "0.4a" should read --0.4$a$--

Signed and Sealed this

Twenty Second Day of April, 2008

JON W. DUDAS
*Director of the United States Patent and Trademark Office*